United States Patent

[11] 3,555,251

[72] Inventor Gideon Shavit
 Skokie, Ill.
[21] Appl. No. 688,613
[22] Filed Dec. 6, 1967
[45] Patented Jan. 12, 1971
[73] Assignee Honeywell Inc.
 Minneapolis, Minn.
 a corporation of Delaware

[54] OPTIMIZING SYSTEM FOR A PLURALITY OF TEMPERATURE CONDITIONING APPARATUSES
6 Claims, 2 Drawing Figs.

[52] U.S. Cl. .................................................. 235/151,
 235/150.1, 340/172.5
[51] Int. Cl. .................................................. G06f 15/46
[50] Field of Search ...................................... 235/151,
 150.1, 151.1; 236/14, 15; 340/172.5

[56] References Cited
UNITED STATES PATENTS
3,309,507 3/1967 Schlein .......................... 235/150.1

OTHER REFERENCES
Brooks: Problems in programming Coutrol Computers Automation, February 1963 pp. 78– 82

Primary Examiner—Malcolm A. Morrison
Assistant Examiner—Felix D. Gruber
Attorneys—Lamont B. Koontz, Francis A. Sirr and Clyde C. Blinn ABSTRACT: A control system for optimizing the operation of a plurality of electrical power operated temperature conditioning apparatuses wherein a digital computer periodically determines the prevailing total temperature conditioning load, selects the number of apparatuses to be energized, and distributes the total load by using efficiency data stored in the computer for each apparatus to thereby operate each apparatus to supply a selected portion of the total at a minimum total electrical power consumption for all the apparatuses.

FIG. 2

STORED DATA (FOR ONE CHILLER)

| LOAD (TONS) | COMPRESSOR HEAD OR DIFFERENTIAL TEMPERATURE ΔT | | | | | |
|---|---|---|---|---|---|---|
| | $\Delta T_1$ | $\Delta T_2$ | $\Delta T_3$ | $\Delta T_4$ | $\Delta T_5$ | $\Delta T_6$ |
| 0 | ELECTRICAL POWER ↓ | ELECTRICAL POWER ↓ | ELECTRICAL POWER ↓ | ELECTRICAL POWER ↓ | ELECTRICAL POWER ↓ | |
| 50 | | | | | | |
| 100 | | | | | | |
| 150 | | | | | | |
| 200 | | | | | | |
| 250 | | | | | | |
| 300 | | | | | | |
| 350 | | | | | | |
| 400 ↓ | | | | | | |

3,555,251

1

OPTIMIZING SYSTEM FOR A PLURALITY OF TEMPERATURE CONDITIONING APPARATUSES

BACKGROUND OF THE INVENTION

With the advent of low cost digital computers, the supervision and control of power operated temperature conditioning apparatuses for large buildings by a digital computer has become economically practical. The desirability of optimizing the operation of temperature conditioning apparatus for the most economical operation has always been an aim of the building engineer. With the rapid change in factors such as outdoor temperature, wind, sun, radiation, as well as internal conditions such as the number of human beings, lighting heat, and the number of operating appliances, the total temperature conditioning load varies so rapidly that a human being is limited in his capability of maintaining the most efficient operation.

SUMMARY OF THE INVENTION

The present invention is concerned with a control system for distributing a total temperature conditioning load among a plurality of power operated temperature conditioning apparatuses by using a digital computer to optimize the load distribution to the apparatuses in order to obtain a minimum power input for all operating apparatuses.

Specifically, the computer calculates the total temperature conditioning load of a building, determines and energizes the number of apparatuses needed for the calculated load, distributes the total load to the apparatuses in accordance with stored efficiency data for each apparatus for optimizing, and controls each apparatus to obtain the selected distribution. Additionally the computer updates stored efficiency data by measuring certain apparatus operating characteristics periodically, whereby on subsequent optimizing operations the upgraded data is used.

BRIEF DESCRIPTION OF THE DRAWING

FIG. 2 is a schematic showing of data stored in apparatus 46.

DESCRIPTION

Figure 1:
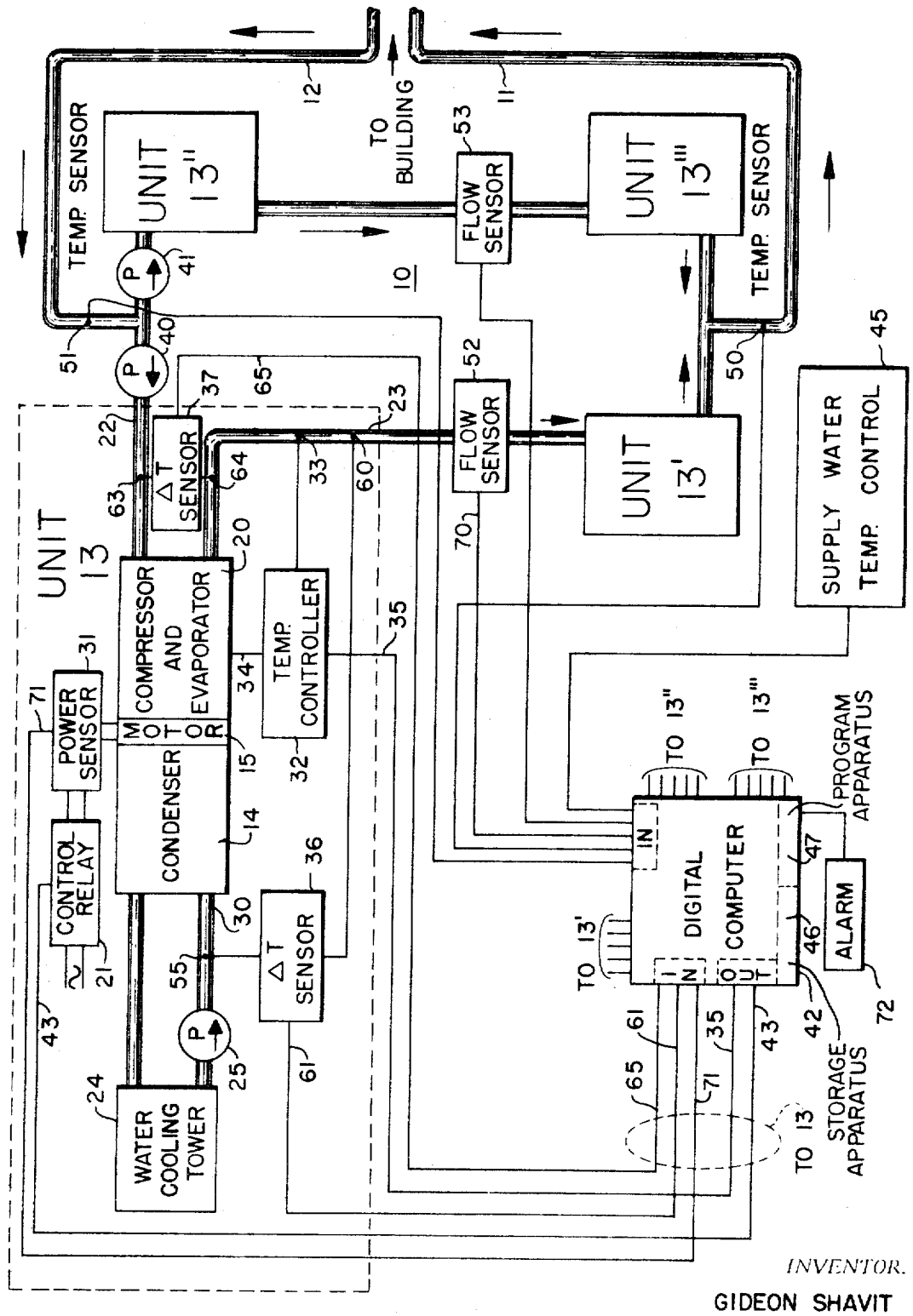
FIG. 1 is a schematic representation of a temperature conditioning system having four water chillers connected to supply chilled water to a building for air conditioning, with a digital computer for controlling the operation of the chillers.

Referring to FIG. 1, a water temperature conditioning system 10 delivers chilled medium or water by a supply pipe 11 and return pipe 12 to apparatus in a building, not shown, using chilled water for air cooling. System 10 comprises a plurality of temperature conditioning apparatuses or water chiller units 13, 13', 13" and 13'''.

All chillers are identical. Referring to chiller 13, each chiller has a condenser 14, a power source or motor 15 and a compressor and evaporator 20. Upon the energization of motor 15, from a source of power through a control relay 21, heat is removed from water entering the evaporator through pipe 22 to supply chilled water through pipe 23. The heat from the condenser is removed by a medium or water from a cooling tower 24 from which water is circulated by a pump 25 into the inlet pipe 30 of the condenser. The power or electrical energy to motor 15 is measured by an electrical power responsive apparatus or power sensor 31. The capacity of water chiller 13 is controlled by a temperature controller 32 having a remote temperature responsive element 33 responsive to the temperature of the water leaving the evaporator in pipe 23. The output 34 of temperature controller 32 is connected to control the capacity of the compressor in a conventional manner, such as by operating a suction damper to control the flow of refrigerant to the evaporator. The control point of temperature controller 32 is adjusted by means of an input 35. Chiller 13, as well as the other chillers, also have differential temperature signal apparatuses or ΔT sensors 36 and 37 which will be described in more detail.

2

The four water chillers are connected in a series-parallel relation whereby water from return pipe 12 is pumped by a pump 40 into the inlet of water chiller 13 and then through chiller 13' to be delivered to the supply pipe 11. Connected in series-parallel are chillers 13" and 13''' with a pump 41 pumping water from return pipe 12 into series connected water chillers 13" and 13''' to deliver chilled water to supply pipe 11.

A digital computer 42 has a plurality of inputs and a plurality of outputs which are connected to receive and deliver signals to the various elements of system 10. Computer 42 has a storage means or apparatus 46 which can store data and a program apparatus 47 for operating the water chillers in an efficient manner.

Stored in the storage means of the computer is initial data or tables of operating characteristics for each water chiller as shown schematically in FIG. 2. The initial data is obtained when the chiller is first operated or from the chiller manufacturer and is stored as in a matrix with refrigeration cooling load in tons (12,000 BTU/hr.) as one axis and differential temperature as the other axis, with a value of electrical power input for each combination of load and differential temperature. The differential temperature, which is one parameter indicative of compressor head, is the difference between the entering condenser water temperature and the leaving chiller water temperature.

OPERATION

Assuming that the stored program of the digital computer 42 provides for the energization of at least one of the water chillers for an initial startup condition, control relay 21 is energized through output 43 and water chiller 13 is operated to remove heat from the water circulating through the evaporator. Upon the computer receiving a signal from a supply water temperature control apparatus 45, indicative of the desired temperature of the supply water, such as 46° F., to meet the cooling load of the building, the computer adjusts the control point of temperature controller 32 by means of output 35.

The temperature conditioning load of the building is calculated by the computer by responding to (1) the difference between the inlet and outlet water temperature as sensed by the temperature responsive elements 51 and 50 which are connected to the input of the computer, and (2) the combined water flow in each of the parallel branches as sensed by the flow responsive apparatus or sensors 52 and 53 which are connected to the input of the computer. Knowing the building temperature conditioning load (total tons of refrigeration cooling needed to satisfy the cooling requirement of the building) computer 42 controls the energization of the relays 21 of the water chillers so that the number of chillers energized is within the closest 100 tons exceeding the building temperature conditioning load. Assuming that the temperature conditioning load was calculated as 1800 tons, computer 42 energizes the control relays 21 to start water chillers 13' and 13". With chillers 13, 13' and 13" operating, at a maximum output and assuming the chillers are 800 ton water chillers, a temperature conditioning capacity of 2400 tons could be obtained.

ΔT sensor 36 has a temperature responsive element 55 in the inlet water pipe of the condenser and a temperature responsive element 60 in the outlet water pipe of the evaporator, whereby a differential temperature output signal indicative of compressor head from output 61 is connected to the input of the computer. Either assuming an arbitrary differential temperature signal if the now operating chiller was just energized, or using the differential temperature signal from apparatus 36 if the chiller has been operating, computer 42 refers to the stored initial data to distribute the total load to the three operating water chillers so a total electrical power consumption is as low as possible. Such a distribution might result in the three operating chillers having a selected load of 600, 500 and 700 tons for the respective chillers to make up the 1800 ton total load.

After the load which each chiller is to supply has been determined, the computer then adjusts the output of each operating chiller by adjusting the control point of the temperature controller 32 of each operating chiller. ΔT sensor 37 having a temperature responsive means 63 in the inlet pipe 22 and a temperature responsive means 64 in the outlet pipe 23 provides an output signal at 65 for each operating chiller which is connected to the input of the computer to be indicative of the temperature difference between the inlet and outlet water of the chiller. A flow signal is received from water flow sensor 52 by an output 70 connected to the input of the computer to provide a quantity flow measurement. The thermal output of each chiller can be calculated by (1) the differential temperature and (2) the quantity water flow. By the adjustment of the control point of controller 32 of chillers 13, 13' and 13'' until the output of the respective chillers is at the selected level (500, 600 and 700 tons for the example), the total ton output is 1800 tons. Computer 42 is programmed for an optimizing operation of system 10 every 20 minutes so that the number of chillers being operated and/or the readjustment of the chiller temperature controller is redetermined every 20 minutes to maintain optimum operation.

As the building load changes, the signal from apparatus 45 is used by the computer to readjust the supply water temperature as measured by element 50, by changing the control point of controller 32 of the operating chillers. Assuming that apparatus 45 signals for a need for 44° F. supply water, the computer readjusts controller 32 of the operating chillers until element 50 indicates 44° F. water temperature. The supply water temperature adjustment may take place several times in-between the optimizing operation.

The operating characteristics of the chillers can change as the total operating time of the chiller increases due to physical changes, such as when lime collects in the water pipes. At the end of each 20 minute period, before a new optimizing operation is made, the computer measures for each operating chiller the prevailing values of (1) electrical power input as measured by sensor 31 connected to input 71, (2) the tons of refrigeration output, and (3) the temperature differential signal between the condenser inlet water and the evaporator outlet water which are utilized to update the stored data for each operating chiller. To obtain the updated value, 5 percent of the prevailing value of electrical power input is added to 95 percent of previously stored updated value of the electrical power input and a new updated value is stored in the computer along side the initial value for the particular tons-differential temperature combination. In this manner, the updating operation of the stored data takes place in the smooth manner to keep the stored data updated for subsequent optimizing operations. By means of a signal indication apparatus or alarm 72 connected to the output of the computer, when the updated value of power input exceeds the initial value of power for a particular chiller tons-differential temperature combination by some predetermined amount (such as 10 percent) an alarm is energized to acknowledge the fact that the operating characteristics of the water chiller have changed to an extent requiring possible overhaul or maintenance.

I claim:

1. A control system for optimizing the distribution of a temperature conditioning load among a plurality of power operated temperature conditioning apparatuses by selectively distributing the load to the apparatuses to obtain a minimum total power input for operation of the apparatuses, comprising:

a computer having a plurality of inputs and outputs, storage means and program means; said storage means has stored therein data of temperature conditioning load levels and values of power input for various values of parameters of the apparatuses, said data being stored for each of the apparatuses whereby said program means can select the temperature conditioning load for each apparatus in accordance with said data to provide for the optimum combined power operation of the apparatuses;

first condition responsive means responsive to the total temperature conditioning load;

means connecting said first responsive means to one of said computer inputs whereby said computer receives a signal indicative of the total temperature conditioning load;

a plurality of second condition responsive means each being responsive to at least one parameter of each of said apparatuses;

means connecting each of said second responsive means individually to other of said computer inputs whereby said computer receives a signal indicative of an operating parameter of each apparatus;

said computer including said program means and said storage means distributing the total temperature conditioning load to said apparatuses using said parameter of each apparatus to load each apparatus at a particular power input to obtain the minimum total power input for the needed operation level of the apparatuses to provide said total temperature conditioning load;

controller means for each apparatus connected to its respective apparatus for controlling the operation thereof; and means connecting said controller means of each apparatus individually to one of said outputs of said computer whereby said computer adjusts the operation of each apparatus to distribute the total temperature conditioning load to the apparatuses to provide a minimum total power input for all apparatuses.

2. The control system of claim 1 wherein said computer periodically updates said data stored in said storage means for each apparatus with prevailing data obtained during operation whereby updated data for each of the apparatuses is available including:

input power responsive means for each apparatus individually connected to an input of said computer, and wherein said second condition responsive means is responsive to a parameter indicative of compressor head.

3. The control system of claim 2:

wherein said storage means stores the initial value of input power and the updated value of input power for each combination of compressor head and output of each apparatus and including:

indication means connected to said computer, said indication means being energized when said updated input power exceeds said initial input power by a predetermined amount.

4. The system of claim 2 wherein said computer upon updating said data uses a first percent of the last value of said data and a second percent of the prevailing value of said data.

5. The control system of claim 1:

wherein each of said apparatuses are refrigeration water chillers having a compressor, medium cooled condenser and a water chilling evaporator;

said evaporators having water inlets and outlets combined to furnish chilled water to a building;

wherein said first condition responsive means comprises a differential temperature responsive means responsive to the water temperature of the water supplied to the building and returning from the building and flow responsive means responsive to the total water flow to the building whereby the building temperature conditioning load is determined by said computer;

wherein said data for each water chiller includes a thermal output versus a differential temperature with an input power for said compressor for each combination of thermal output and differential temperature, said differential temperature being the difference between the temperature of the condenser inlet water and the evaporator outlet water whereby for a particular differential temperature said program means can select the thermal output of a chiller to provide the minimum input power;

wherein said temperature and flow responsive means includes differential temperature responsive means responsive to the outlet and inlet water temperature and flow responsive means responsive to water flow of each water chiller whereby the thermal output of the water chiller is determined by said computer; and wherein said controller means is for adjusting the outlet water temperature for each chiller.

6. The control system of claim 1:

wherein said data is periodically updated for each apparatus as data is obtained; and wherein each of said second responsive means is responsive to a parameter indicative of compressor head.